US007740759B2

(12) United States Patent
Su et al.

(10) Patent No.: US 7,740,759 B2
(45) Date of Patent: Jun. 22, 2010

(54) MAGNETIC SEPARATION DEVICE

(75) Inventors: Chih Hsien Su, Kaohsiung (TW); Hsiao Cheng Lin, Hsinchu (TW); Chi-Min Chau, Taichung County (TW); Yuh-Jiuan Lin, Taipei County (TW); Wen-Hsun Kuo, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 676 days.

(21) Appl. No.: 11/736,555

(22) Filed: Apr. 17, 2007

(65) Prior Publication Data

US 2008/0156714 A1 Jul. 3, 2008

(30) Foreign Application Priority Data

Dec. 29, 2006 (TW) .............................. 95149899 A

(51) Int. Cl.
*B01D 35/06* (2006.01)
*B03C 1/02* (2006.01)
*B01L 9/06* (2006.01)

(52) U.S. Cl. ....................... 210/222; 210/232; 210/695; 422/101; 422/104; 422/186.01

(58) Field of Classification Search ................. 210/222, 210/232, 695; 422/101, 104, 186.01
See application file for complete search history.

(56) References Cited

U.S. PATENT DOCUMENTS

| | | | | |
|---|---|---|---|---|
| 4,895,650 | A * | 1/1990 | Wang | 210/222 |
| 5,779,892 | A | 7/1998 | Miltenyi et al. | |
| 6,193,892 | B1 | 2/2001 | Krueger et al. | |
| 6,413,420 | B1 | 7/2002 | Foy et al. | |
| 6,730,217 | B2 | 5/2004 | Schaaf et al. | |

FOREIGN PATENT DOCUMENTS

| | | |
|---|---|---|
| CN | 1035252 A | 9/1989 |
| JP | 64-018417 | 1/1989 |
| JP | 2005-074371 | 3/2005 |
| TW | I230147 | 4/2005 |
| TW | M266971 | 6/2005 |
| TW | M279635 | 11/2005 |
| WO | WO 96/26782 | 9/1996 |

* cited by examiner

*Primary Examiner*—David A Reifsnyder
(74) *Attorney, Agent, or Firm*—Quintero Law Office

(57) ABSTRACT

A magnetic separation device separating magnetic material from a working fluid of a container is disclosed. The magnetic separation device includes a first element, a second element and a magnetic assembly structure including a plurality of magnetic units. The first element includes a first body, a plurality of first main positioning portions disposed on the first body, and a plurality of first sub-positioning portions disposed on the first body and next to the first main positioning portions to receive the container. The second element includes a second body, a plurality of second main positioning portions disposed on the second body, and a plurality of second sub-positioning portions disposed on the second body and next to the second main positioning portions to receive the container. The magnetic units disposed on the first main positioning portions and the second main positioning portions absorb magnetic material from the working fluid.

28 Claims, 12 Drawing Sheets

E1

MAGNETIC SEPARATION DEVICE

BACKGROUND OF THE INVENTION

1. Field of the Invention

The invention relates to a magnetic separation device, and more particularly relates to a magnetic separation device capable of separating magnetic material from a working fluid of a container.

2. Description of the Related Art

In general, after a separation process, a conventional magnetic separation device is not able to efficiently separate magnetic substances from liquid, thus, the concentration of the separated target is not purified completely, and the activity of biomaterial contained in the liquid may be destroyed.

BRIEF SUMMARY OF THE INVENTION

The invention provides a magnetic separation device capable of separating magnetic material from a working fluid of at least one container. An embodiment of the magnetic separation device comprises a first element, a second element and a magnetic assembly structure.

The first element comprises a first body, a plurality of first main positioning portions disposed on the first body and a plurality of first sub-positioning portions disposed on the first body. At least one of the first main positioning portions is disposed next to at least one of the first sub-positioning portions, and the first sub-positioning portions receive the at least one container.

The second element comprises a second body, a plurality of second main positioning portions disposed on the second body, and a plurality of second sub-positioning portions disposed on the second body. At least one of the second main positioning portions is disposed next to at least one of the second sub-positioning portions, and the second sub-positioning portions receive the at least one container.

Another embodiment of a magnetic assembly structure comprises a plurality of magnetic units. Each magnetic unit comprises first and second segments disposed on the first and second main positioning portions of the first and second elements respectively. The magnetic units are utilized to absorb the magnetic material from the working fluid of the least one container located between the first sub-positioning portions of the first element and the second sub-positioning portions of the second element.

The second main positioning portions of the second element are connected to the first sub-positioning portions of the first element when the second body of the second element is disposed on the first body of the first element. The first body of the first element comprises a first main surface. The first main positioning portions and the first sub-positioning portions are disposed on the first main surface of the first body of the first element. The first main positioning portions are located between the first sub-positioning portions.

The first main positioning portions form a first main recess on the first main surface of the first body of the first element. The first sub-positioning portions form a plurality of first sub-recesses on the first main surface of the first body of the first element, wherein the first main recess and the first sub-recesses are not connected. The first main recess is a cross-shaped recess.

The first body comprises a first main surface and a first sub-surface, wherein the first main positioning portions are disposed on the first main surface of the first body. The first sub-positioning portions are disposed on the first main surface and the first sub-surface of the first body. The first main positioning portions are located between the first sub-positioning portions. The first main positioning portions form a first main recess on the first main surface of the first body of the first element. The first sub-positioning portions form a plurality of first sub-recesses on the first main surface and the first sub-surface of the first body of the first element. The first main recess and the first sub-recesses are not connected. The first main recess can be a cross-shaped recess.

The second body comprises a second main surface, and the second main positioning portions. The second sub-positioning portions are disposed on the second main surface of the second body. The second main positioning portions are located between the second sub-positioning portions. The second main positioning portions form a second main recess on the second main surface of the second body of the second element. The second sub-positioning portions form a plurality of second sub-recesses on the second main surface of the second body of the second element. The second main recess and the second sub-recesses are not connected. The second main recess can be a cross-shaped recess. Alternatively, the second body comprises a second main surface and a second sub-surface. The second main positioning portions are disposed on the second main surface of the second body. The second sub-positioning portions are disposed on the second main surface and the second sub-surface of the second body. The second main positioning portions are located between the second sub-positioning portions. The second main positioning portions form a second main recess on the second main surface of the second body of the second element. The second sub-positioning portions form a plurality of second sub-recesses on the second main surface and the second sub-surface of the second body of the second element, wherein the second main recess and the second sub-recesses are not connected. The second main recess can be a cross-shaped recess. The magnetic units comprise a plurality of cross-arranged rectangular magnets.

The magnetic separation device can further comprise a plate detachably disposed on the second body of the second element, wherein the plate comprises a plurality of indentations corresponding to the second sub-positioning portions of the second element and a plurality of stoppers respectively formed on the indentations.

A magnetic separation device of another embodiment is capable of separating magnetic material from a working fluid of at least one container. The magnetic separation device comprises a first element and a magnetic assembly structure. The first element comprises a first body, a plurality of first positioning portions disposed on the first body, and at least one second positioning portion disposed on the first body. The first positioning portions and the at least one second positioning portion are crossed with each other, and the at least one container is detachably disposed on the first positioning portions and the at least one second positioning portion.

The magnetic assembly structure is disposed next to the first positioning portions and the at least one second positioning portion to absorb the magnetic material from the working fluid of the least one container disposed on the first positioning portions and the at least one second positioning portion.

The first positioning portions are first recesses formed on the first body and the at least one second positioning portion is a second recess formed on the first body and connected to the first recesses. The first body of the first element is rectangular. The first body of the first element is ladder-like.

The magnetic assembly structure comprises a plurality of first magnetic units and a plurality of second magnetic units, wherein the first magnetic units and the second magnetic units are alternatively arranged. The first element further comprises at least one third positioning portion disposed on the first body and next to the first recesses and the second positioning portion, utilized for positioning the magnetic assembly structure. The third positioning portions are recesses formed on the first body.

The magnetic separation device can further comprise at least one first plate disposed on the first body to position the at least one container disposed on the first positioning portions. The first plate comprises a plurality of first holes corresponding to the first positioning portions disposed on the first body and a plurality of first stoppers disposed next to the first plate.

The magnetic separation device can further comprise at least one second plate disposed on the first body to position the at least one container disposed on the at least one second positioning portion. The second plate comprises at least one second hole corresponding to the at least one second positioning portion disposed on the first body and at least one second stopper disposed next to the at least one second hole. The first body of the first element is made of a transparent material.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is provided for the purpose of illustrating the general principles of the invention and should not be taken in a limiting sense. The scope of the invention is best determined by reference to the appended claims.

Figure 1A:
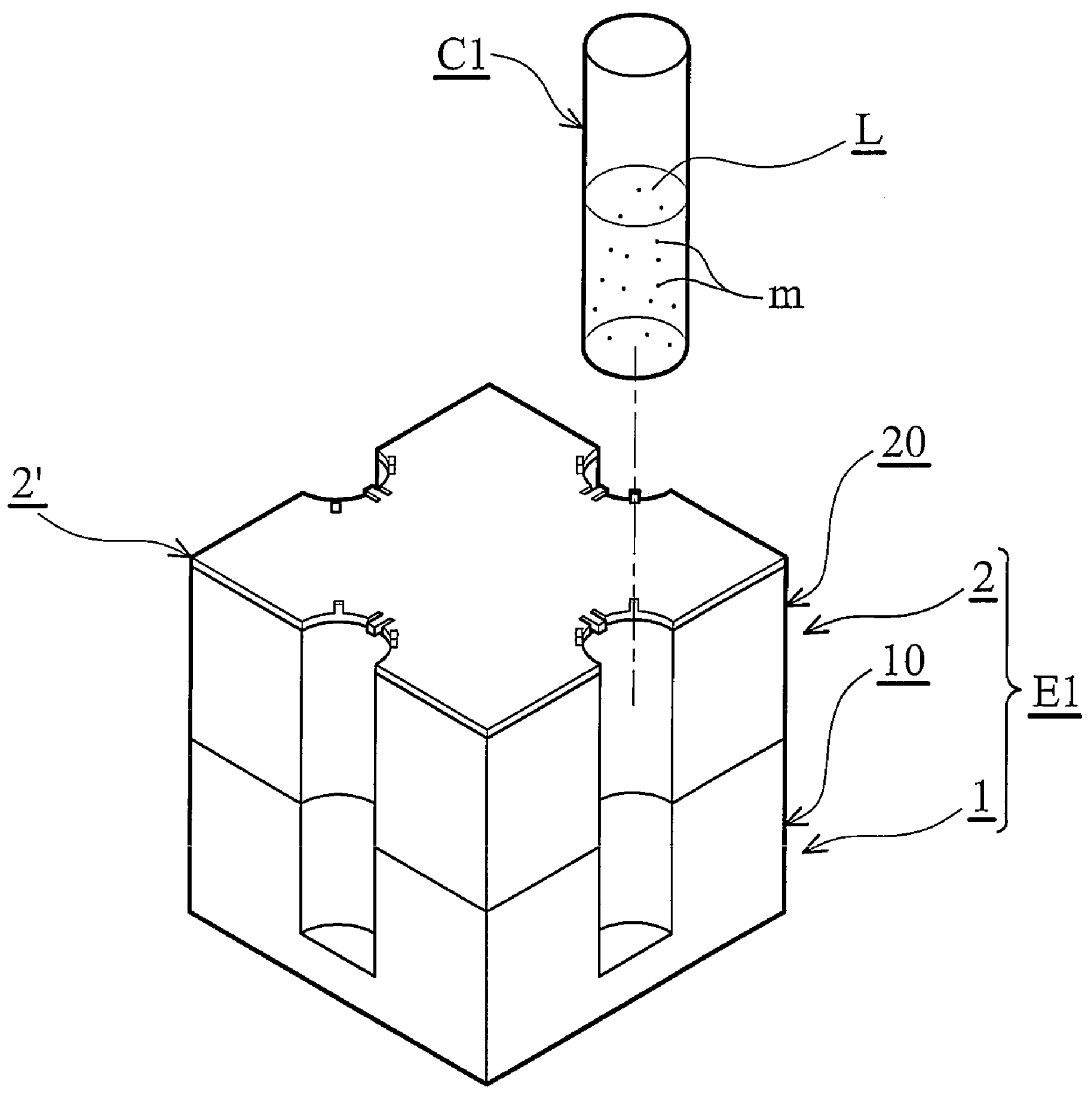
FIG. 1A is a perspective view of a magnetic separation device of a first embodiment of the invention.
Figure 1B:
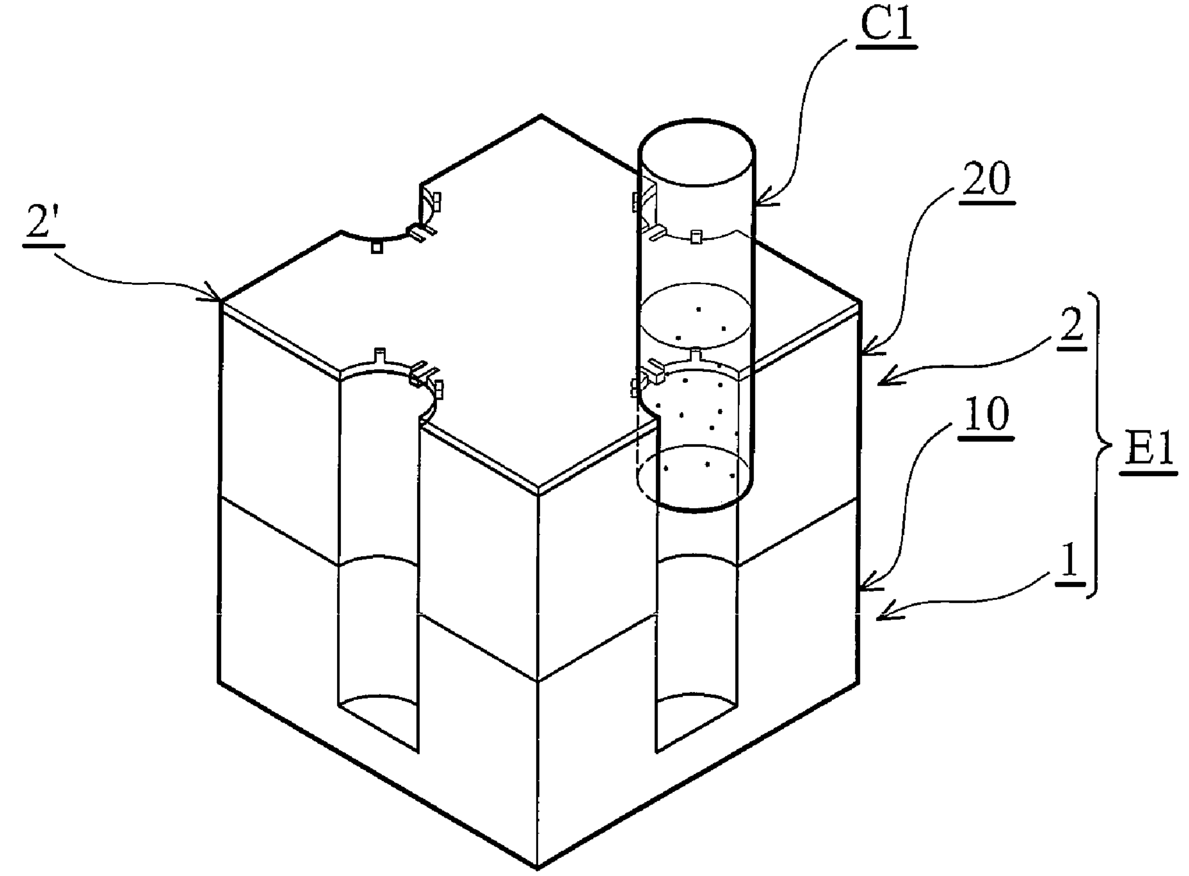
FIG. 1B is a perspective view of the magnetic separation device of the first embodiment of the invention.

In FIGS. 1A and 1B, a magnetic separation device E1 of a first embodiment is capable of separating magnetic material m from a working fluid L of a container C1. The container C1 is detachably disposed on the magnetic separation device E1.

Figure 2A:
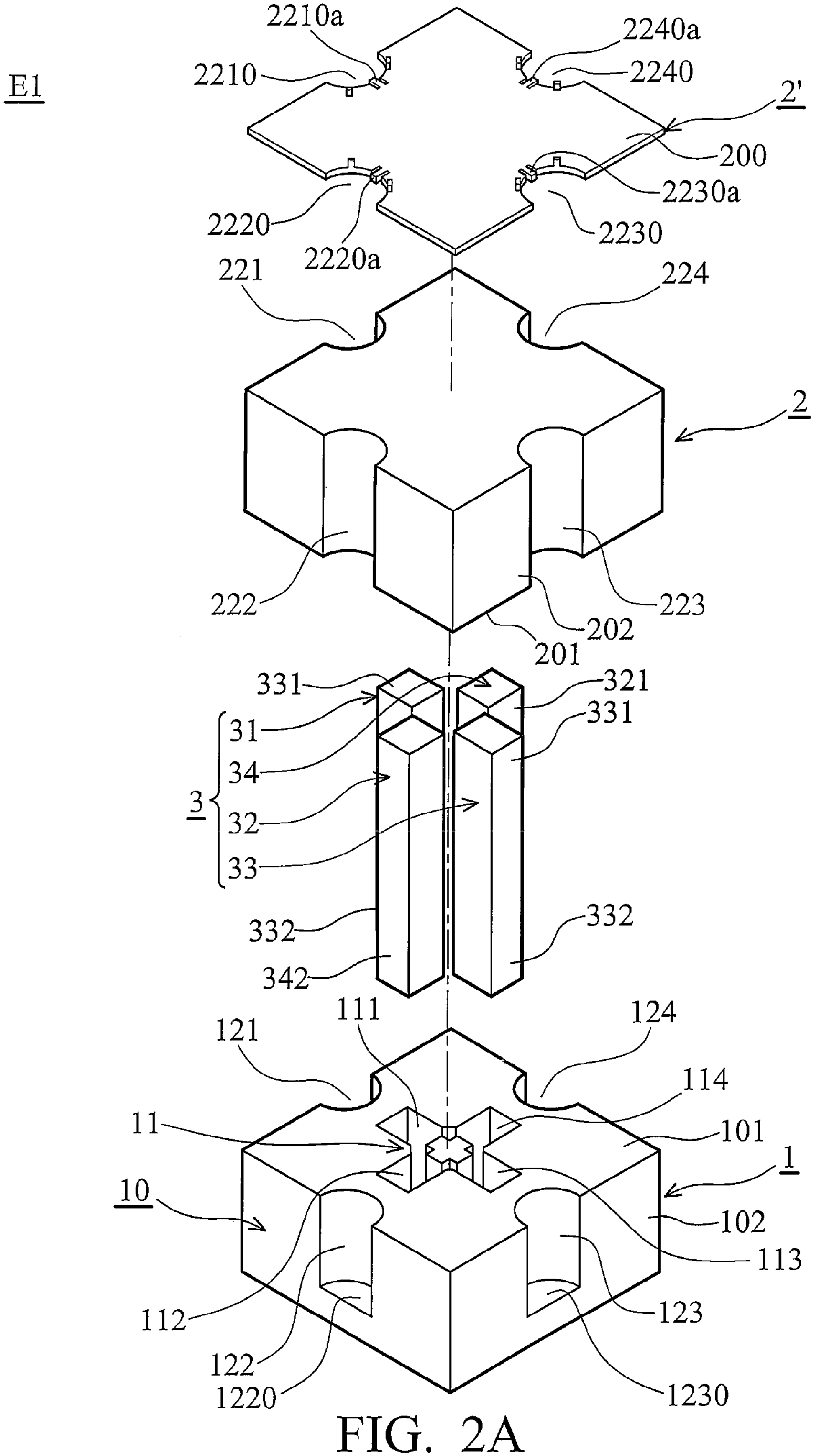
FIG. 2A is an exploded view of the magnetic separation device of the first embodiment of the invention.
Figure 2B:
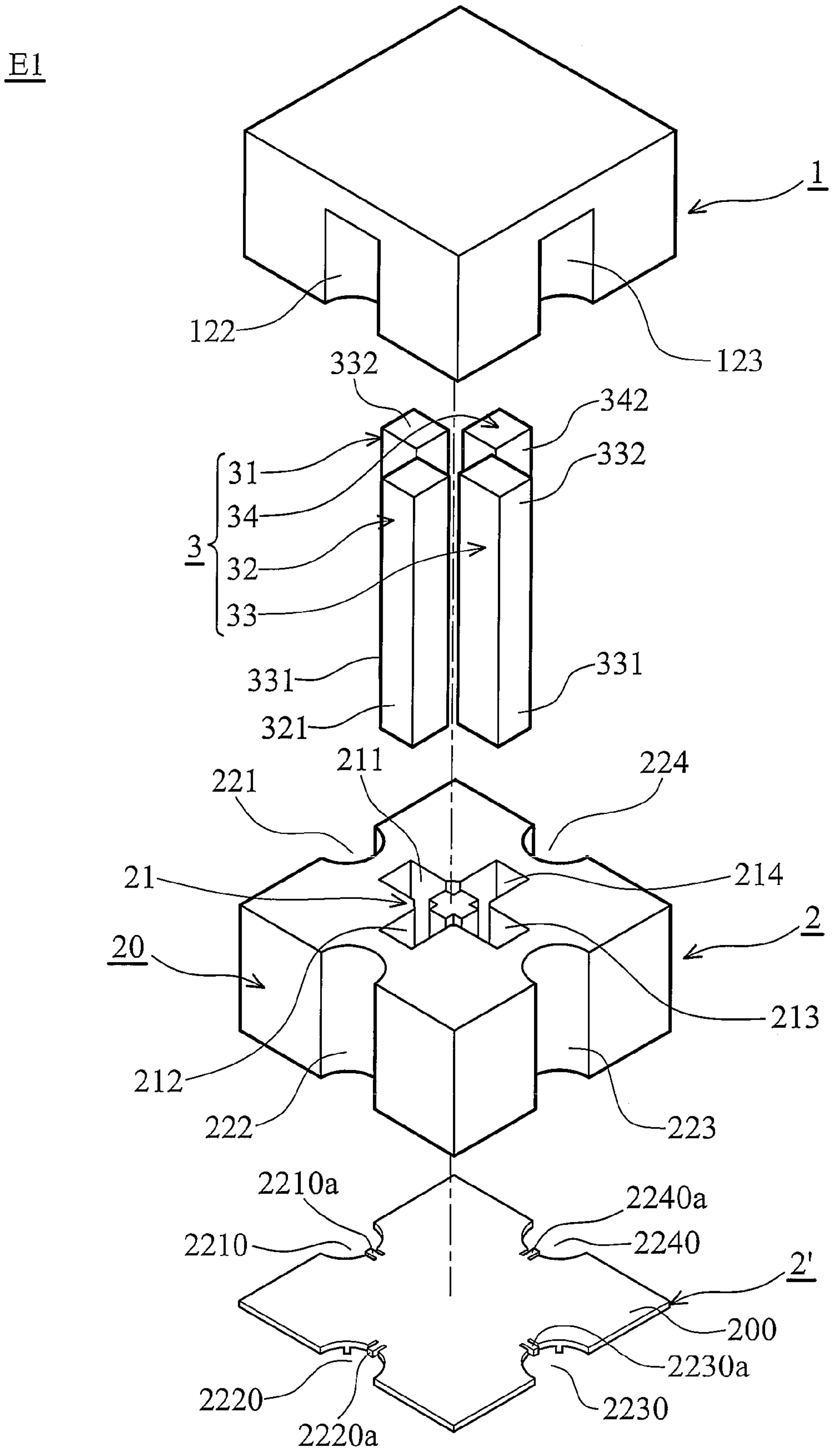
FIG. 2B is an exploded view of the magnetic separation device of the first embodiment of the invention.

In FIGS. 2A and 2B, viewed from opposite directions, the magnetic separation device E1 comprises a first element 1, a second element 2, a plate 2' and a magnetic assembly structure 3.

In FIG. 2A, the first element 1 comprises a first body 10 having a first main surface 101 and a first sub-surface 102. A plurality of first main positioning portions 111, 112, 113 and 114 are disposed on the first main surface 101 of the first body 10. A plurality of first sub-positioning portions 121, 122, 123 and 124 are disposed on the first main and sub-surfaces 101 and 102 of the first body 10 as well as next to the first main positioning portions 111, 112, 113 and 114. Each first sub-positioning portion 121, 122, 123 and 124 has a bottom, for example, the bottoms 1210 and 1220 of the first sub-positioning portions 121 and 122. The first sub-positioning portions 121, 122, 123 and 124 disposed on the first main and sub-surfaces 101 and 102 of the first body 10 are utilized to position the container C1. The first main positioning portions 111, 112, 113 and 114 formed on the first main surface 101 are located between the first sub-positioning portions 121, 122, 123 and 124.

In this embodiment, the first body 10 is rectangular, the first main surface 101 is an end surface of the body 10, and the first sub-surface 102 is a circumferential surface of the body 10. Further, the first main positioning portions 111, 112, 113 and 114 form a first main recess 11 on the first main surface 101 of the first body 10 of the first element 1. The first sub-positioning portions 121, 122, 123 and 124 form a plurality of first sub-recesses on the first main surface 101 of the first body 10 of the first element 1. The first main recess 11 and the first sub-recesses 121, 122, 123 and 124 are not connected. The first main recess 11 is a cross-shaped recess, and the first sub-recesses 121, 122, 123 and 124 are semi-cylindrical recesses. The quantity of first sub-recesses 121, 122, 123 and 124 is four.

Referring FIGS. 2A and 2B, the second element 2 comprises a second body 20 having a second main surface 201 and a second sub-surface 202, a plurality of second main positioning portions 211, 212, 213 and 214 disposed on the second main surface 201 of the second body 20. Additionally, a plurality of second sub-positioning portions 221, 222, 223 and 224 are disposed on the second main and sub-surfaces 201 and 202 of the second body 20 as well as next to the second main positioning portions 211, 212, 213 and 214. The second main positioning portions 211, 212, 213 and 214 disposed on the second main surface 201 of the second body 20 are utilized to position the container C1, and second main positioning portions 211, 212, 213 and 214 disposed on the second main surface 201 are located between the second sub-positioning portions 221, 222, 223 and 224.

In this embodiment, the second body 20 is rectangular, the second main surface 201 is an end surface of the second body 20, and the second sub-surface 202 is a circumferential surface of the second body 20. Further, the second main positioning portions 211, 212, 213 and 214 form a second main recess 21 on the second main surface 201 of the second body 20 of the second element 2. The second sub-positioning portions 221, 222, 223 and 224 form a plurality of second sub-recesses on the second main surface 201 of the second body 20 of the second element 2. The second main recess 21 and the second sub-recesses 221, 222, 223 and 224 are not connected. The second main recess 21 is a cross-shaped recess, and the second sub-positioning portions 221, 222, 223 and 224 are semi-cylindrical recesses. The quantity of second sub-positioning portions 221, 222, 223 and 224 is four.

The plate 2' detachably disposed on the second body 20 of the second element 2 comprises a plurality of indentations 2210, 2220, 2230 and 2240 formed on the second body 20 and corresponding to the second sub-positioning portions 221, 222, 223 and 224 of the second element 2. A plurality of stoppers 2210*a*, 2220*a*, 2230*a* and 2240*a* are formed on the edges of the indentations 2210, 2220, 2230 and 2240 respectively.

When the second body 20 of the second element 2 is disposed on the first body 10 of the first element 1, the second sub-positioning portions 221, 222, 223 and 224 of the second element 2 are respectively connected to the first sub-positioning portions 121, 122, 123 and 124 of the first element 1. Thus, the container C1 can be positioned in the connected first/second sub-positioning portions 121/221, 122/222, 123/223, and 124/224, and the stoppers 2210*a*, 2220*a*, 2230*a* and 2240*a* of the plate 2' can prevent the container C1 in the connected first/second sub-positioning portions 121/221, 122/222, 123/223, and 124/224 from slipping or disengaging.

The magnetic assembly structure 3 comprises a plurality of magnetic units 31, 32, 33 and 34, each comprising a first segment 311, 321, 331 and 341 disposed on the first main positioning portions 111, 112, 113 and 114 of the first element 1. Second segments 312, 322, 332 and 342 are disposed on the second main positioning portions 211, 212, 213 and 214 of the second element 2. The magnetic units 31, 32, 33 and 34 are thereby utilized to absorb the magnetic material m from the working fluid L of the container C1 located between the first sub-positioning portions 121, 122, 123 and 124 of the first element 1 and the second sub-positioning portions 221, 222, 223 and 224 of the second element 2. In this embodiment, the magnetic units 31, 32, 33 and 34 are cross-arranged rectangular magnets.

Thus, the magnetic material m of the working fluid L received in the container C1 can be absorbed by the magnetic units 31, 32, 33 and 34 disposed on the first sub-recesses 121, 122, 123 and 124 of the first element 1 and the second sub-positioning portions 221, 222, 223 and 224 of the second element 2.

Figure 3:
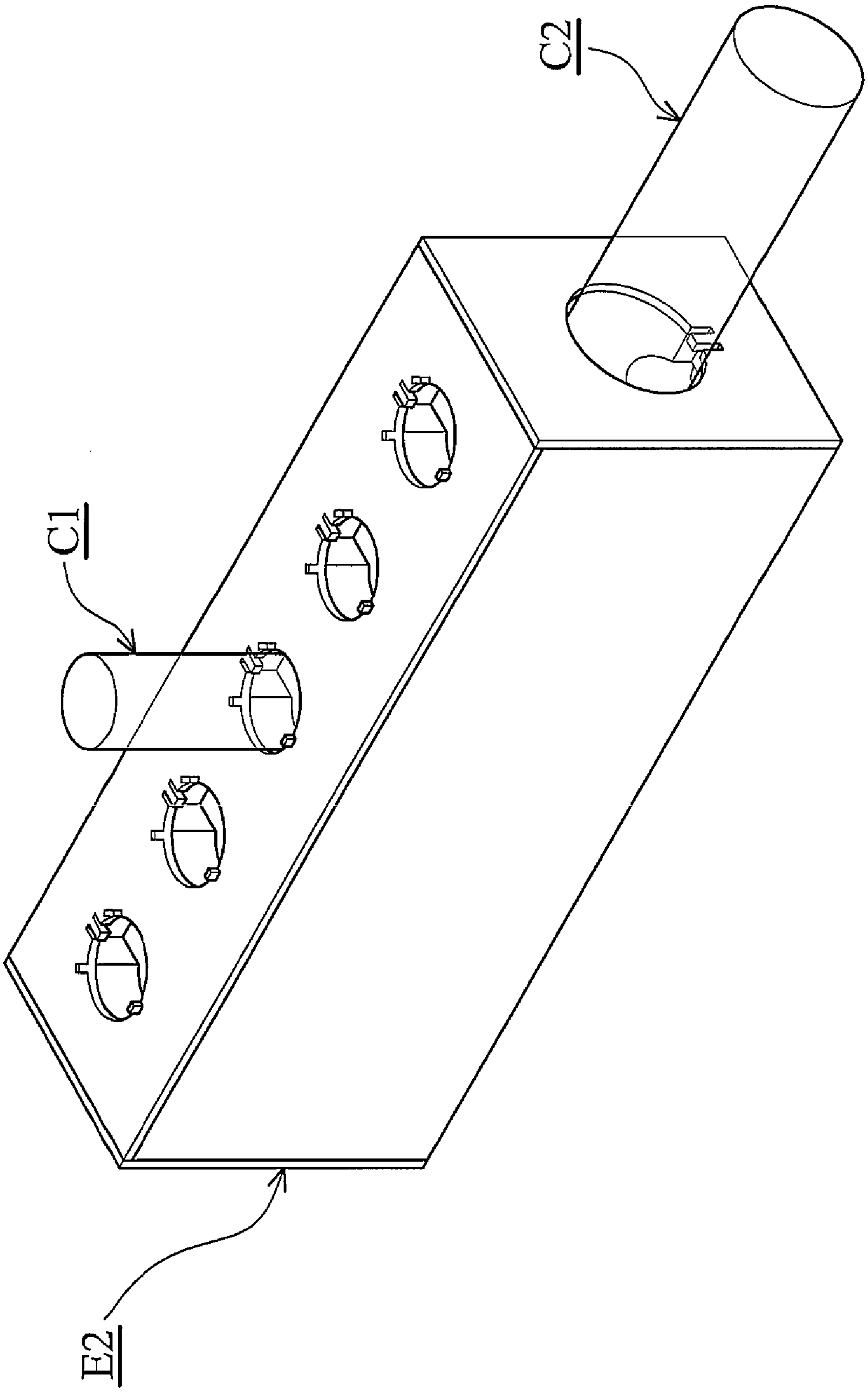
FIG. 3 is a perspective view of a magnetic separation device of a second embodiment of the invention.

In FIG. 3, a magnetic separation device E2 of a second embodiment is capable of positioning two different containers C1 and C2, to separate magnetic material m from a working fluid L received in the container C1 and C2.

Figure 4A:
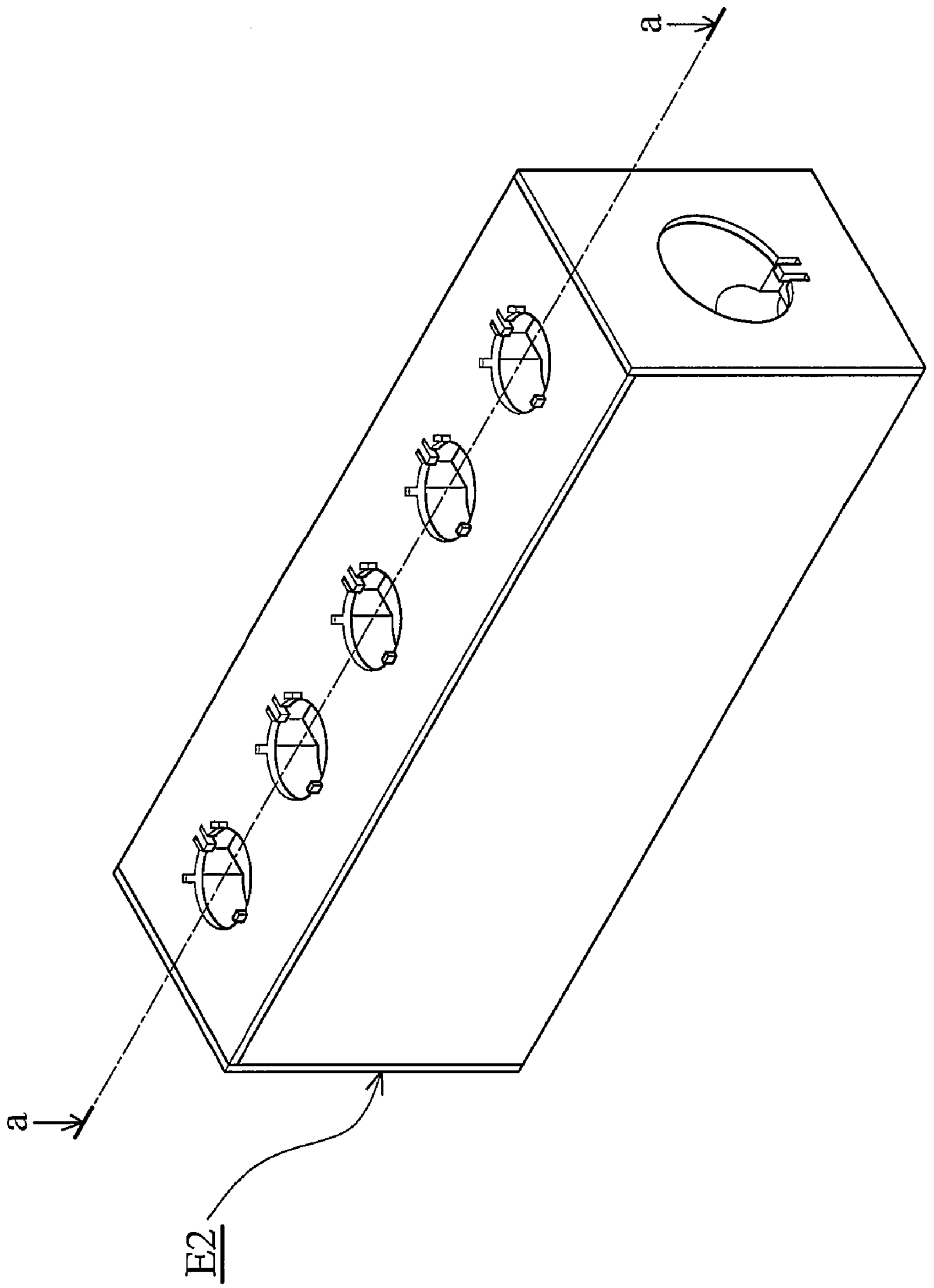
FIG. 4A is a perspective view of the magnetic separation device of the second embodiment of the invention.
Figure 4B:
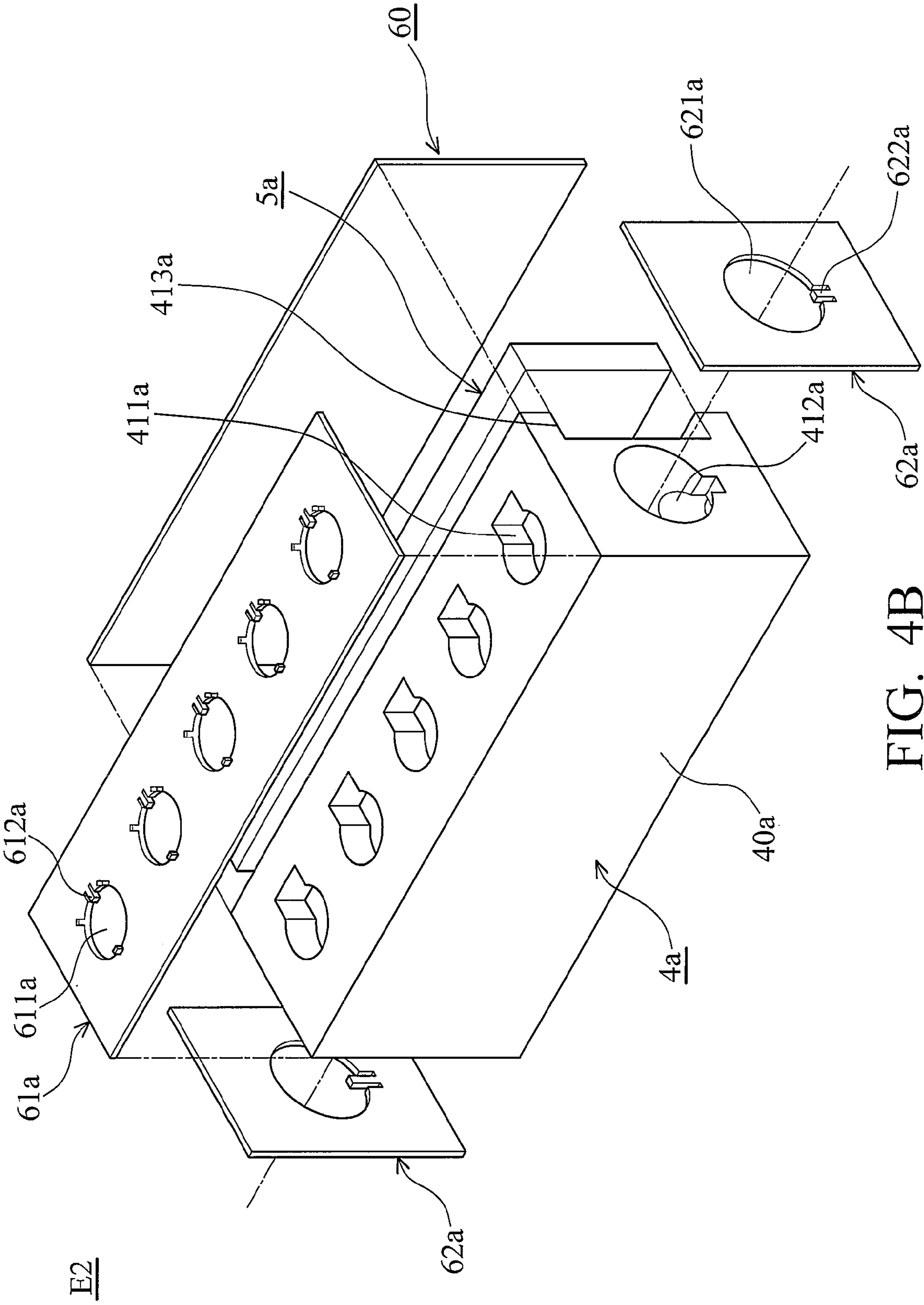
FIG. 4B is a perspective view of the magnetic separation device of the second embodiment of the invention, wherein the magnetic separation device includes a first element, a magnetic assembly structure, a cover, a first plate and two second plates.

In FIGS. 4A and 4B, the magnetic separation device E2 comprises a first element 4*a*, a magnetic assembly structure 5*a*, a cover 60, a rectangular first plate 61*a*, and two rectangular second plates 62*a*. The first element 4*a* comprises a rectangular first body 40*a*, a plurality of first positioning portions 411*a* disposed on the first body 40*a* to detachably position the container C1, a second positioning portion 412*a* disposed on the first body 40*a* and crossing with the first positioning portions 411*a* to detachably position the container C2, and a third positioning portion 413*a* disposed on the first body 40*a* and next to the first positioning portions 411*a* and the second positioning portion 412*a*. In this embodiment, the first positioning portions 411*a* are first recesses, the second positioning portion 412*a* is a second recess connected to the first recesses, and the third positioning portion 413*a* is a third recess formed on the first body 40*a*. The first body 40*a* of the first element 4*a* is made of transparent material.

The first plate 61*a* disposed on the first body 40*a* of the first element 4*a* is used to position and clip the container C1 disposed on the first positioning portion 411*a*, to prevent the container C1 from slipping or disengaging. The first plate 61*a* comprises a plurality of first holes 611*a* corresponding to the first positioning portions 411*a* formed on the first body 40*a* and a plurality of first stoppers 612*a* and 612*b* disposed next to the first holes 611*a*.

The second plate 62*a* disposed on the first body 40*a* is used to position and clip the container C2 disposed on the second positioning portion 412*a*, to prevent the container C2 from slipping or disengaging. The second plate 62*a* comprises a second hole 621*a* corresponding to the second positioning portion 412*a* of the first body 40*a* and a second stopper 622*a* disposed next to the second hole 621*a*.

When the container C1 is disposed on the first positioning portion 411*a* of the first body 40*a* via the first hole 611*a* of the first plate 61*a* and the container C2 is disposed on the second positioning portion 412*a* of the first body 40*a* via the second hole 621*a* of the second plate 62*a*, the containers C1 and C2 are respectively positioned by the first and second stoppers 612*a* and 622*a*.

Figure 5A:
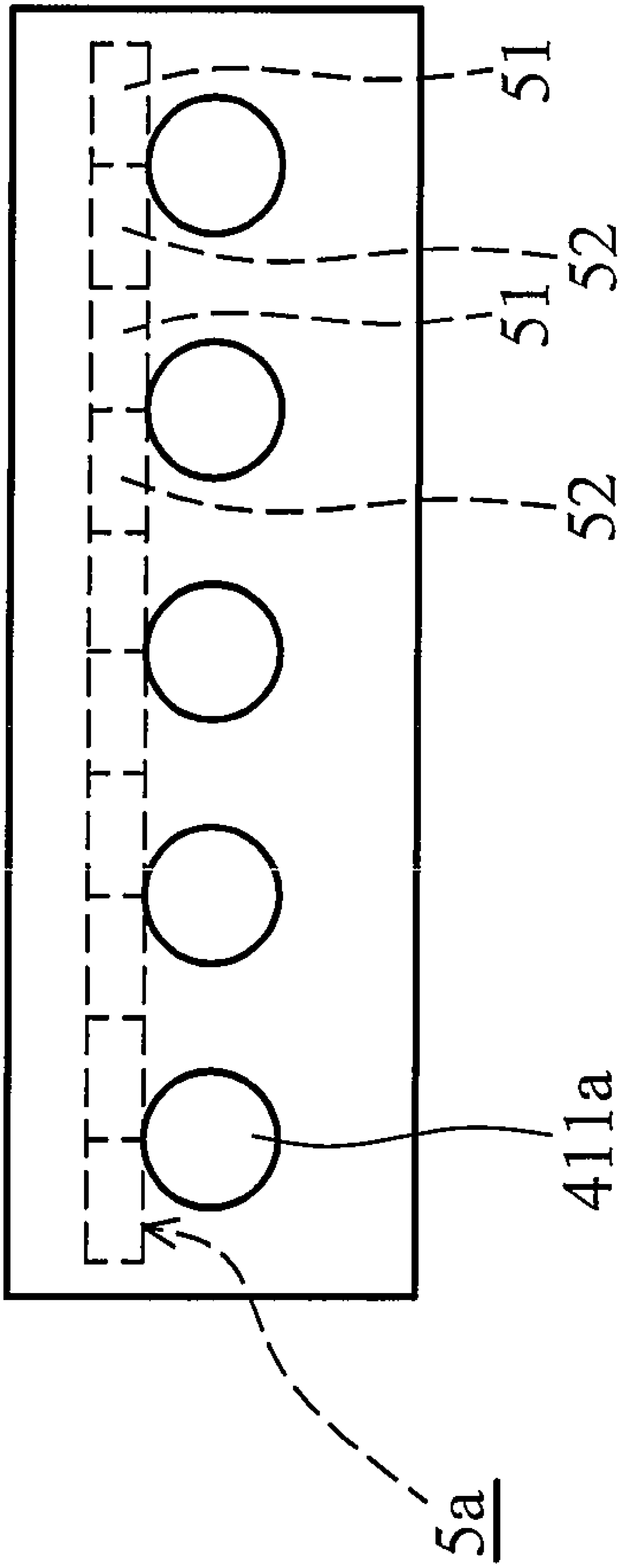
FIG. 5A is a schematic view showing the inner structure of the magnetic separation device of FIG. 4A.
Figure 5B:
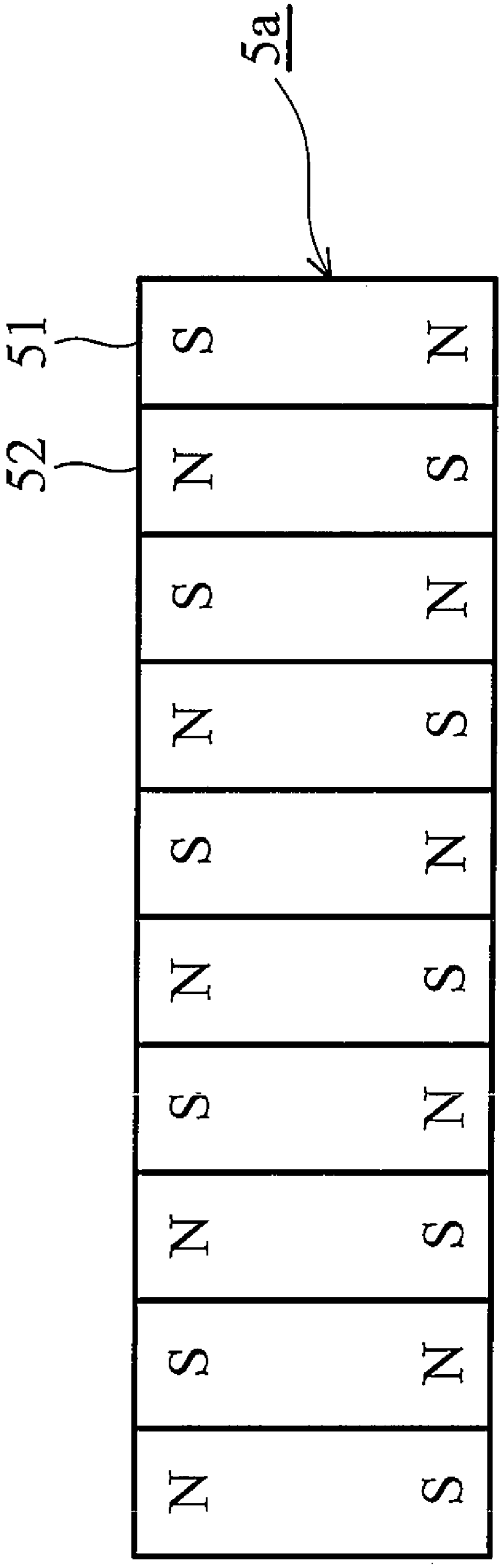
FIG. 5B is a schematic view of the magnetic assembly structure of FIG. 4B.

In FIGS. 5A and 5B, the magnetic assembly structure 5*a* comprises a plurality of alternatively-arranged first and second magnetic units 51 and 52. S-polarity of the first magnetic unit 51 is next to N-polarity of the neighbored second magnetic unit 52, i.e., N-polarity of the first magnetic unit 51 is next to S-polarity of the neighbored second magnetic unit 52. The magnetic assembly structure 5*a* positioned on the third positioning portion 413*a* is disposed next to the first positioning portion 411*a* and the second positioning portion 412*a* to absorb the magnetic material m from the working fluid L of the container C1 disposed on the first positioning portion 411*a* and the container C2 disposed on the second positioning portion 412*a*. In FIG. 4B, the cover 60 disposed on one side of the first body 40*a* is utilized to cover the magnetic assembly structure 5*a* positioned on the third positioning portion 413*a*.

Thus, the magnetic material m of the working fluid L received in the container C1 and/or C2 can be absorbed by the magnetic assembly structure 5*a*.

Figure 6:
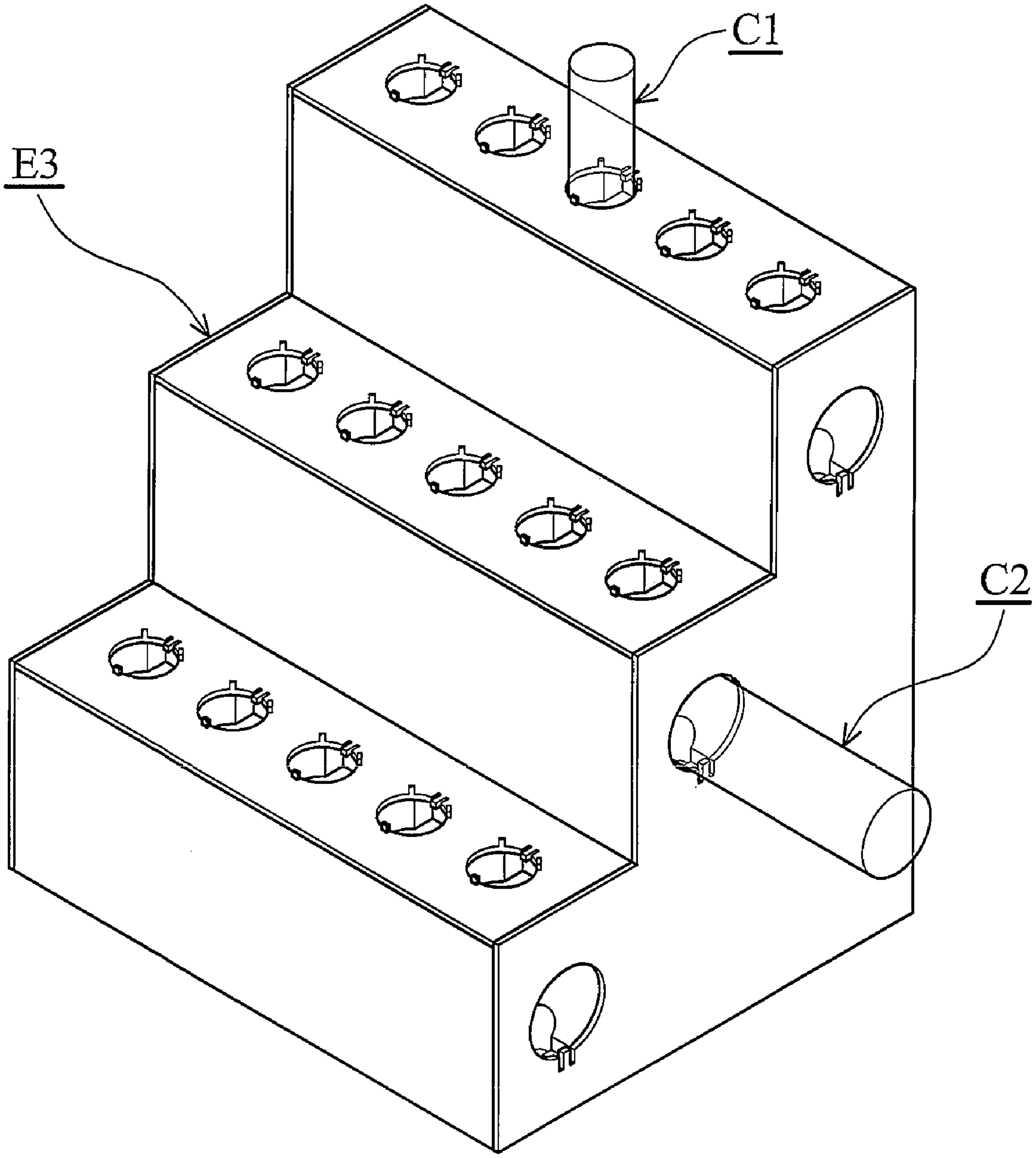
FIG. 6 is a perspective view of a magnetic separation device of a third embodiment of the invention.

In FIG. 6, a magnetic separation device E3 of a third embodiment is capable of positioning two different containers C1 and C2, to separate magnetic material m from a working fluid L received in the containers C1 and C2.

Figure 7A:
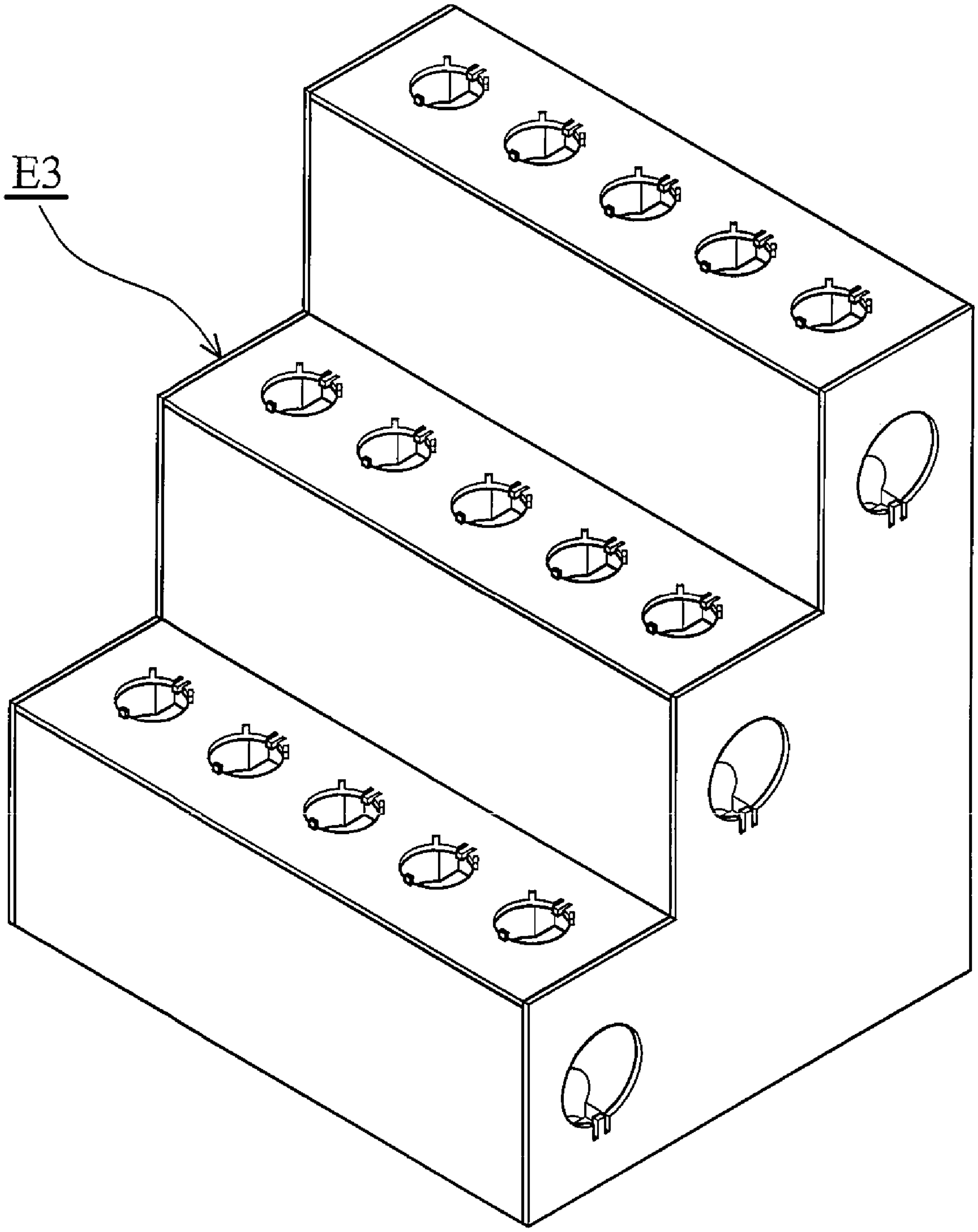
FIG. 7A is a perspective view of the magnetic separation device of the third embodiment of the invention.
Figure 7B:
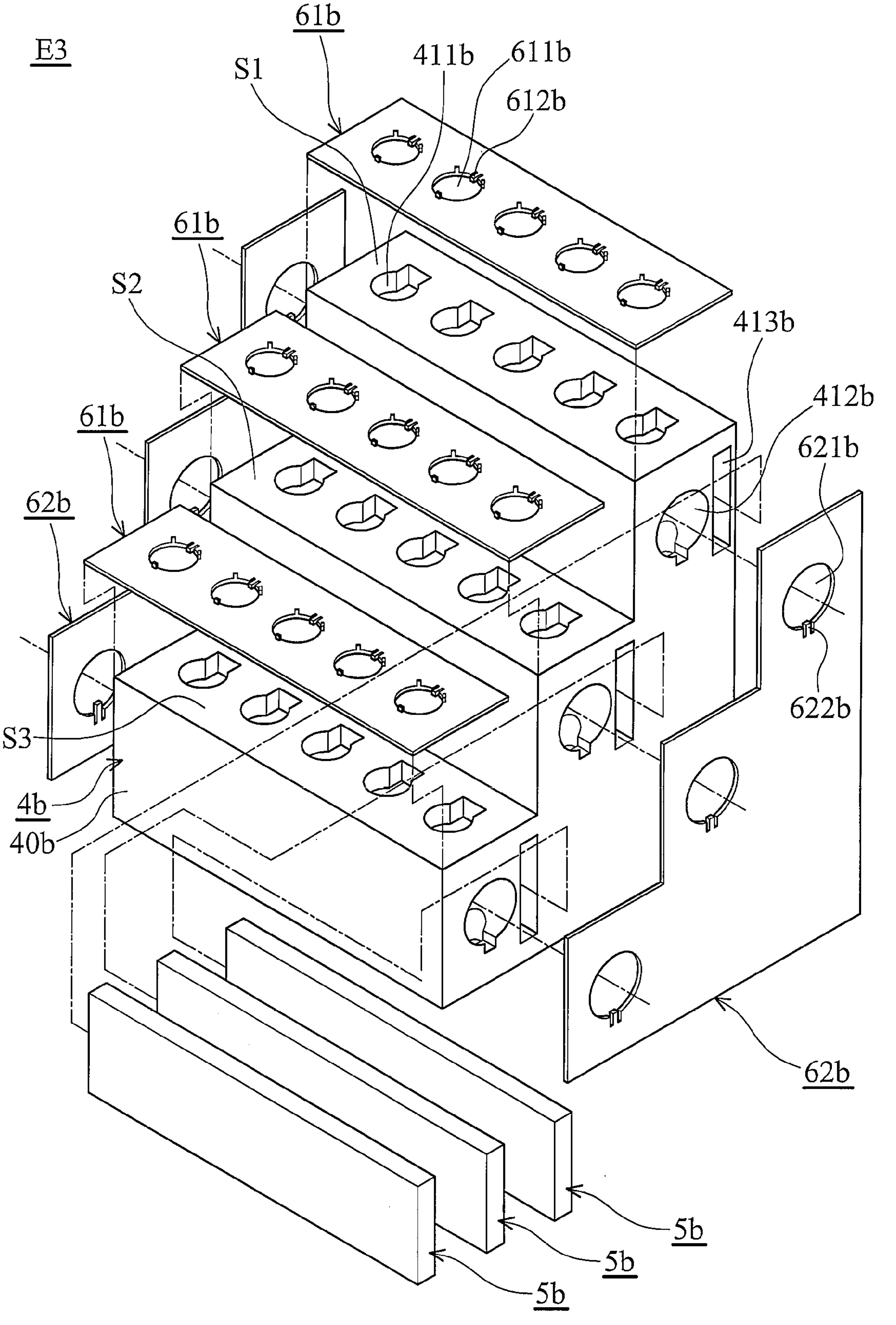
FIG. 7B is an exploded view of the magnetic separation device of the third embodiment of the invention.

In FIGS. 7A and 7B, the magnetic separation device E3 comprises a first element 4*b*, a plurality of magnetic assembly structures 5*b*, a plurality of first plates 61*b* and a plurality of second plates 62*b*.

The first element 4*b* comprises a ladder-like first body 40*b* formed of three steps S1, S2 and S3. A plurality of first positioning portions 411*b* is disposed on the steps S1, S2 and S3 of the first body 40*b*. A plurality of second positioning portions 412*b* are disposed on the sidewall of the first body 40*b* crossing the first positioning portions 411*b*. A plurality of third positioning portions 413*b* are disposed on the sidewall of the first body 40*b* and next to the first and second positioning portions 411*b* and 412*b* for positioning the magnetic assembly structures 5*b*. The containers C1 and C2 are detachably disposed on the first and second positioning portions 411*b* and 412*b*, respectively. In this embodiment, the first positioning portions 411*b* are first recesses formed on the first body 40*b*, the second positioning portions 412*b* are second recesses formed on the first body 40*b* crossing with the first recesses, and the third positioning portions 413*b* are third recesses formed on the first body 40*b*. The first body 40*b* of the first element 4*b* is made of transparent material.

The first plates 61*b* disposed on the first body 40*b* are utilized to position the container C1 disposed on the first positioning portions 411*b*. The first plate 61*b* comprises a plurality of first hole 611*b* corresponding to the first positioning portions 411*b* disposed on the first body 40*b* and a plurality of first stoppers 612*b* respectively disposed next to the first holes 611*b*.

The second plate 62*b* disposed on the first body 40*b* are utilized to position the container C2 disposed on the second positioning portion 412*b*. The second plate 62*b* comprises a plurality of second holes 621*b* corresponding to the second positioning portion 412*b* disposed on the first body 40*b* and a plurality of second stoppers 622*b* disposed next to the second holes 621*b*. The third positioning portions 413*b* are covered by the second plates 62*b* when the second plates 62*b* are disposed on the first body 40*b*.

When the container C1 is disposed on the first positioning portion 411*b* of the first body 40*b* via the first hole 611*b* of the first plate 61*b* and the container C2 is disposed on the second positioning portion 412*b* of the first body 40*b* via the second hole 621*b* of the second plate 62*b*, the containers C1 and C2 are respectively positioned by the first and second stoppers 612*b* and 622*b*.

The magnetic assembly structures 5*b* positioned on the third positioning portions 413*b* are disposed next to the first and second positioning portions 411*b* and 412*b* to absorb the magnetic material m from the working fluid L of the container C1 disposed on the first positioning portion 411*b* and the container C2 disposed on the second positioning portion 412*b*. Thus, the magnetic material m of the working fluid L received in the container C1 and/or C2 can be absorbed by the magnetic assembly structures 5*b*.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A magnetic separation device capable of separating magnetic material from a working fluid of at least one container, comprising:

a first element comprising a first body, a plurality of first main positioning portions disposed on the first body and a plurality of first sub-positioning portions disposed on the first body, wherein at least one of the first main positioning portions is disposed next to at least one of the first sub-positioning portions, and the first sub-positioning portions receive the at least one container;

a second element comprising a second body, a plurality of second main positioning portions disposed on the second body, and a plurality of second sub-positioning portions disposed on the second body, wherein at least one of the second main positioning portions is disposed next to at least one of the second sub-positioning portions, and the second sub-positioning portions receive the at least one container; and a magnetic assembly structure comprising a plurality of magnetic units, wherein each of the magnetic units comprises a first segment disposed on the first main positioning portions of the first element and a second segment disposed on the second main positioning portions of the second element, utilizing the magnetic units to absorb the magnetic material from the working fluid of the at least one container located between the first sub-positioning portions of the first element and the second sub-positioning portions of the second element.

2. The magnetic separation device as claimed in claim 1, wherein the second main positioning portions of the second element are respectively connected to the first sub-positioning portions of the first element when the second body of the second element is disposed on the first body of the first element.

3. The magnetic separation device as claimed in claim 1, wherein the first body of the first element comprises a first main surface, and the first main positioning portions and the first sub-positioning portions are disposed on the first main surface of the first body of the first element, and the first main positioning portions are located between the first sub-positioning portions.

4. The magnetic separation device as claimed in claim 3, wherein the first main positioning portions form a first main recess on the first main surface of the first body of the first element, and the first sub-positioning portions form a plurality of first sub-recesses on the first main surface of the first body of the first element, wherein the first main recess and the first sub-recesses are not connected.

5. The magnetic separation device as claimed in claim 4, wherein the first main recess is a cross-shaped recess.

6. The magnetic separation device as claimed in claim 1, wherein the first body comprises a first main surface and a first sub-surface, wherein the first main positioning portions are disposed on the first main surface of the first body and the first sub-positioning portions are disposed on the first main surface and the first sub-surface of the first body, wherein the first main positioning portions are located between the first sub-positioning portions.

7. The magnetic separation device as claimed in claim 6, wherein the first main positioning portions form a first main recess on the first main surface of the first body of the first element, and the first sub-positioning portions form a plurality of first sub-recesses on the first main surface and the first sub-surface of the first body of the first element, wherein the first main recess and the first sub-recesses are not connected.

8. The magnetic separation device as claimed in claim 7, wherein the first main recess is a cross-shaped recess.

9. The magnetic separation device as claimed in claim 1, wherein the second body comprises a second main surface, and the second main positioning portions and the second sub-positioning portions are disposed on the second main surface of the second body, wherein the second main positioning portions are located between the second sub-positioning portions.

10. The magnetic separation device as claimed in claim 9, wherein the second main positioning portions form a second main recess on the second main surface of the second body of the second element, and the second sub-positioning portions form a plurality of second sub-recesses on the second main surface of the second body of the second element, wherein the second main recess and the second sub-recesses are not connected.

11. The magnetic separation device as claimed in claim 10, wherein the second main recess is a cross-shaped recess.

12. The magnetic separation device as claimed in claim 1, wherein the second body comprises a second main surface and a second sub-surface, and the second main positioning portions are disposed on the second main surface of the second body, and the second sub-positioning portions are disposed on the second main surface and the second sub-surface of the second body, wherein the second main positioning portions are located between the second sub-positioning portions.

13. The magnetic separation device as claimed in claim 12, wherein the second main positioning portions form a second main recess on the second main surface of the second body of the second element, and the second sub-positioning portions form a plurality of second sub-recesses on the second main surface and the second sub-surface of the second body of the second element, wherein the second main recess and the second sub-recesses are not connected.

14. The magnetic separation device as claimed in claim 13, wherein the second main recess is a cross-shaped recess.

15. The magnetic separation device as claimed in claim 1, wherein the magnetic units comprise a plurality of cross-arranged rectangular magnets.

16. The magnetic separation device as claimed in claim 1, further comprising a plate detachably disposed on the second body of the second element, wherein the plate comprises a plurality of indentations corresponding to the second sub-positioning portions of the second element and a plurality of stoppers respectively formed on the indentations.

17. A magnetic separation device capable of separating magnetic material from a working fluid of at least one container, comprising:

a first element comprising a first body, a plurality of first positioning portions disposed on the first body, and at least one second positioning portion disposed on the first body, wherein the first positioning portions cross the at least one second positioning portion, and the at least one container is detachably disposed either on the first positioning portions or the at least one second positioning portion; and a magnetic assembly structure disposed next to the first positioning portions and the at least one second positioning portion to absorb the magnetic material from the working fluid of the at least one container disposed either on the first positioning portions or the at least one second positioning portion.

18. The magnetic separation device as claimed in claim 17, wherein the first positioning portions are first recesses formed on the first body and the at least one second positioning portion is a second recess formed on the first body and connected to the first recesses.

19. The magnetic separation device as claimed in claim 17, wherein the first body of the first element is rectangular.

20. The magnetic separation device as claimed in claim 17, wherein the first body of the first element is ladder-like.

21. The magnetic separation device as claimed in claim 17, wherein the magnetic assembly structure comprises a plurality of first magnetic units and a plurality of second magnetic units, wherein the first magnetic units and the second magnetic units are alternatively arranged.

22. The magnetic separation device as claimed in claim 17, wherein the first element further comprises at least one third positioning portion disposed on the first body and next to the first recesses and the second positioning portion, utilized for positioning the magnetic assembly structure.

23. The magnetic separation device as claimed in claim 22, wherein the third positioning portions are recesses formed on the first body.

24. The magnetic separation device as claimed in claim 17, further comprising at least one first plate disposed on the first body to position the at least one container disposed on the first positioning portions.

25. The magnetic separation device as claimed in claim 24, wherein the at least one first plate comprises a plurality of first holes corresponding to the first positioning portions disposed on the first body and a plurality of first stoppers disposed next to the first plate.

26. The magnetic separation device as claimed in claim 17, further comprising at least one second plate disposed on the first body to position the at least one container disposed on the at least one second positioning portion.

27. The magnetic separation device as claimed in claim 26, wherein the at least one second plate comprises at least one second hole corresponding to the at least one second positioning portion disposed on the first body and at least one second stopper disposed next to the at least one second hole.

28. The magnetic separation device as claimed in claim 17, wherein the first body of the first element is made of transparent material.

* * * * *